United States Patent
Shanbhag et al.

(10) Patent No.: US 9,235,355 B2
(45) Date of Patent: Jan. 12, 2016

(54) REVERSE MIRRORING IN RAID LEVEL 1

(71) Applicant: LSI CORPORATION, San Jose, CA (US)

(72) Inventors: Siddharth Suresh Shanbhag, Bangalore (IN); Manoj Kumar Shetty H, Bangalore (IN); Pavan Gururaj, Bangalore (IN); Abhilash Nuggehalli Parthasarathy, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 252 days.

(21) Appl. No.: 13/900,051

(22) Filed: May 22, 2013

(65) Prior Publication Data

US 2014/0304470 A1    Oct. 9, 2014

(30) Foreign Application Priority Data

Apr. 4, 2013    (IN) .............................. 1539/CHE/2013

(51) Int. Cl.
  *G06F 12/00*    (2006.01)
  *G06F 3/06*    (2006.01)
  *G06F 11/20*    (2006.01)

(52) U.S. Cl.
  CPC ................ *G06F 3/065* (2013.01); *G06F 3/061* (2013.01); *G06F 3/064* (2013.01); *G06F 3/0619* (2013.01); *G06F 3/0659* (2013.01); *G06F 3/0689* (2013.01); *G06F 11/2056* (2013.01)

(58) Field of Classification Search
  None
  See application file for complete search history.

(56) References Cited

U.S. PATENT DOCUMENTS

| | | | |
|---|---|---|---|
| 5,805,787 A * | 9/1998 | Brant et al. | 711/113 |
| 6,487,633 B1 * | 11/2002 | Horst et al. | 711/112 |
| 6,785,788 B1 | 8/2004 | Sands, III | |
| 8,271,727 B2 | 9/2012 | Galloway et al. | |
| 8,316,180 B2 | 11/2012 | Galloway et al. | |

OTHER PUBLICATIONS

Thomasian et al, Affinity-Based Routing in Zoned Mirrored Disks, 2005, The Computer Journal vol. 48 No. 3, pp. 292-299.*

* cited by examiner

*Primary Examiner* — Aimee Li
*Assistant Examiner* — Jason Blust

(57) ABSTRACT

Disclosed is a reverse mirroring RAID Level I system and method that decreases read access times. By recording mirrored data in a mirrored disk in a reverse order, spindle access time for data to be read from either the primary disk or the mirrored disk is reduced. As such, overall performance of the reverse mirroring technique is increased.

9 Claims, 3 Drawing Sheets

REVERSE MIRRORING IN RAID LEVEL 1

BACKGROUND

RAID devices have been an important factor in the storage of data for a number of years. The various RAID levels provide certain advantages with respect to cost, reliability and performance. As such, RAID devices have allowed computer systems to store and retrieve data with high reliability, fast access speeds, and low costs compared to individual disk systems.

SUMMARY

An embodiment of the invention may therefore comprise a method of storing data in a RAID Level I system comprising: generating a write command to store the data; storing the data in a first order on a first disk in the system; storing data in a second order on a second disk in the system, the second order being a reverse order from the first order; generating a read command to read the data; determining a distance of a first spindle on the first disk from the data stored on the first disk to generate a first distance; determining a distance of a second spindle on the second disk from the data stored on the second disk to generate a second distance; reading data from the first disk when the first distance is smaller than the second distance and reading data from the second disk when the second distance is smaller than the first distance.

An embodiment of the invention may further comprise a reverse mirroring storage device comprising: a first disk having a first plurality of sectors for storing blocks of data; a first spindle for writing the blocks of data to the first disk and reading the blocks of data from the first disk; a second disk having a second plurality of sectors for storing the blocks of data; a second disk spindle for writing the blocks of data to the second disk and reading the blocks of data from the second disk; an array management controller that controls the first spindle to store the blocks of data, in response to write commands, on the first disk in a first order and controls the second spindle to store the blocks of data on the second disk in a second order, the second order being a reverse order of the first order and, in response to a read command to read a selected block of data, determines a first physical distance of the first spindle from the selected block of data stored on the first disk, and determines a second physical distance of the second spindle from the selected block of data stored on the second disk, and selects a spindle to read data from the first disk or the second disk based upon the shortest distance of the first physical distance and the second physical distance.

DETAILED DESCRIPTION OF THE EMBODIMENTS

Figure 1:
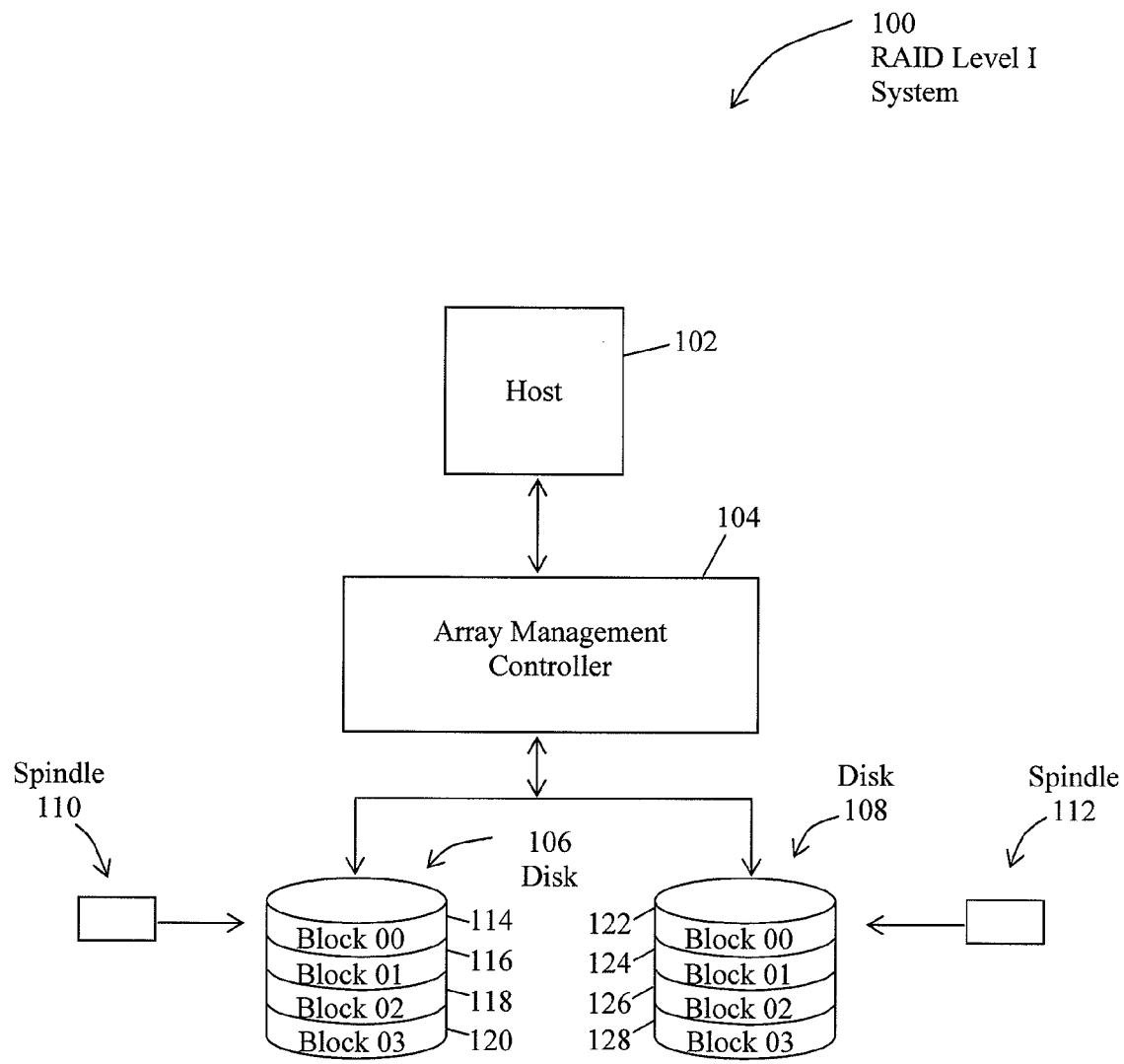
FIG. 1 is an embodiment of a schematic block diagram illustrating a RAID Level I system utilizing direct attached storage.

FIG. 1 illustrates a RAID Level I system 100 using direct attached storage. As illustrated in FIG. 1, the host 102 is connected to an array management controller 104 that interfaces with disks 106, 108 and controls the reading and writing of data between the host 102 and disks 106, 108. The data that is stored on disk 106 is mirrored on disk 108. In other words, the exact same data is stored on the mirrored disk 108, which provides a backup, in case disk 106 fails. This is referred to as RAID Level I, which is also called mirroring. RAID Level I is a frequently used RAID storage system because of its simplicity and high level of data reliability and accessibility.

As illustrated in FIG. 1, the mirror arrayed system consists of two or more physical disks, in which each mirrored array member stores an identical copy of the data. The array management controller 104 may allow parallel access to data stored on disks 106, 108 to achieve high data transfer rates during read operations. In other words, the array management controller 104 may operate disks 106, 108 independently, so that data can be provided from both disks 106, 108 in parallel to the host 102 during read operations. In this manner, the array management controller 104 controls both the reading and writing of data from and to disks 106, 108 by providing control signals that control spindles 110, 112 independently. By operating the spindles 110, 112 independently, data can be read from the various blocks 114, 116, 118, and 120 of disk 106 independently of spindle 112 reading data from blocks 122, 124, 126, and 128 of disk 108. As such, data can be fed from both disks 106, 108 in parallel at essentially twice the speed of a single disk. When three disks are utilized, the data can be read at three times the speed.

Figure 2:
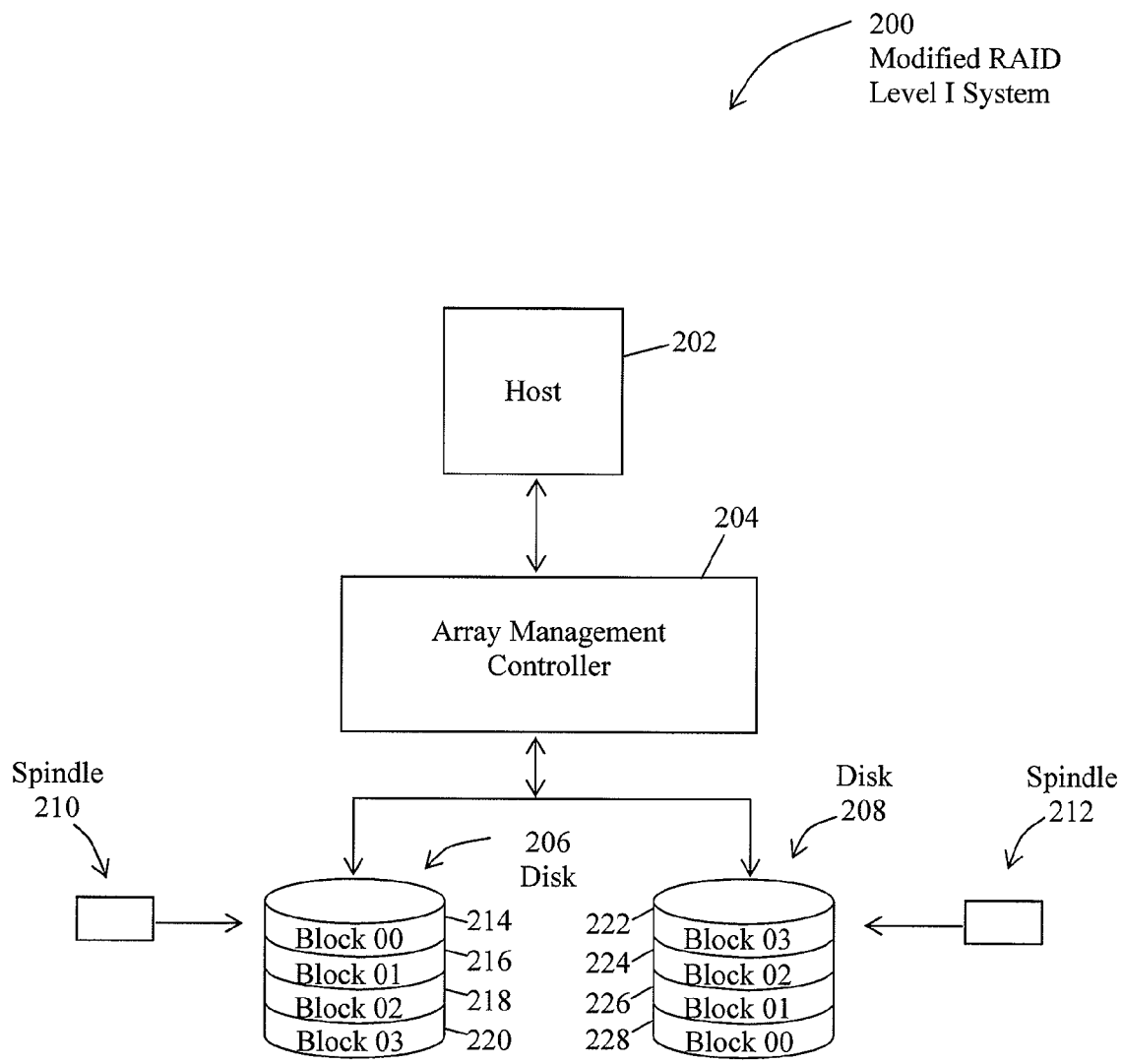
FIG. 2 is an embodiment of a schematic block diagram illustrating a RAID Level I system using direct attached storage with reverse mirroring.

FIG. 2 is a schematic block diagram of an embodiment of a modified RAID Level I system 200 using direct attached storage. As illustrated in FIG. 2, host 202 is coupled to the array management controller 204. The array management controller 204 controls the reading and writing of data from and to disks 206, 208. The array management controller 204 generates control signals that operate spindles 210, 212 to read and write data from and to disks 206, 208. The array management controller 204 controls spindle 210 to record data on disk 206 in the manner illustrated in FIG. 2. As shown in FIG. 2, each of the blocks of data 214, 216, 218, 220 are recorded sequentially on the disk 206 starting at the first sector 214 of disk 206. Spindle 212 is controlled by the array management controller 204 to write the data on disk 208 in a reverse fashion. For example, the data is sequentially written from the last sector 228 of disk 208 to the first sector 222. As illustrated in FIG. 2, block 00 is recorded at the bottom sector 228 of disk 208, whereas block 03 is recorded in the first sector 222 of disk 206. Similarly, block 01 is recorded in sector 226, which is next to the bottom sector 228 of disk 208. Block 02 is recorded in sector 224 of disk 208. Block 00 is recorded in the first sector 214 of disk 206. Block 03 is recorded in the last sector 220 of disk 206. Block 01 is recorded in sector 216, and block 02 is recorded in sector 218 of the disk 206. In this manner, the data is recorded on disk 208 in the opposite configuration as the data that is recorded on disk 206.

During a read operation, both of the spindles 210, 212 may be disposed at the top of the disk 206, 208, as illustrated in FIG. 2. If a read operation is issued by host 202 to read data in block 03, one of the spindles 110, 112, illustrated in FIG. 1, would have to be moved to the bottom of one of the disks 106, 108 to read the data from block 03. This process consumes a great amount of time. However, since data is recorded in a reverse fashion on disk 208, as shown in FIG. 2, spindle 212 could instantly read the block 3 data from sector 222 without moving spindle 212. The time required to move spindles 210, 212 can be from 1-3 seconds, depending upon the distance that the spindle has to move on the disks 206, 208. Accordingly, by recording the data in a reverse fashion on disk 208, the move time for moving spindles 210, 212 can be reduced by selecting the spindle 210, 212 that is closest to the sector on which the data is recorded. Of course, the same is true if the spindles 210, 212 are parked at the bottom position on the disks 206, 208. In that case, data in block 03 could be quickly read from sector 220 of disk 206 without moving spindle 210. Since the array management software controller 204 knows the location of the spindles 210, 212 and also knows the location of the data in each of the sectors 214-228, the spindle 210, 212, that is closest to the sector that contains the data to be read, is used to read the data, which reduces overhead time in moving spindles 210, 212.

Figure 3:
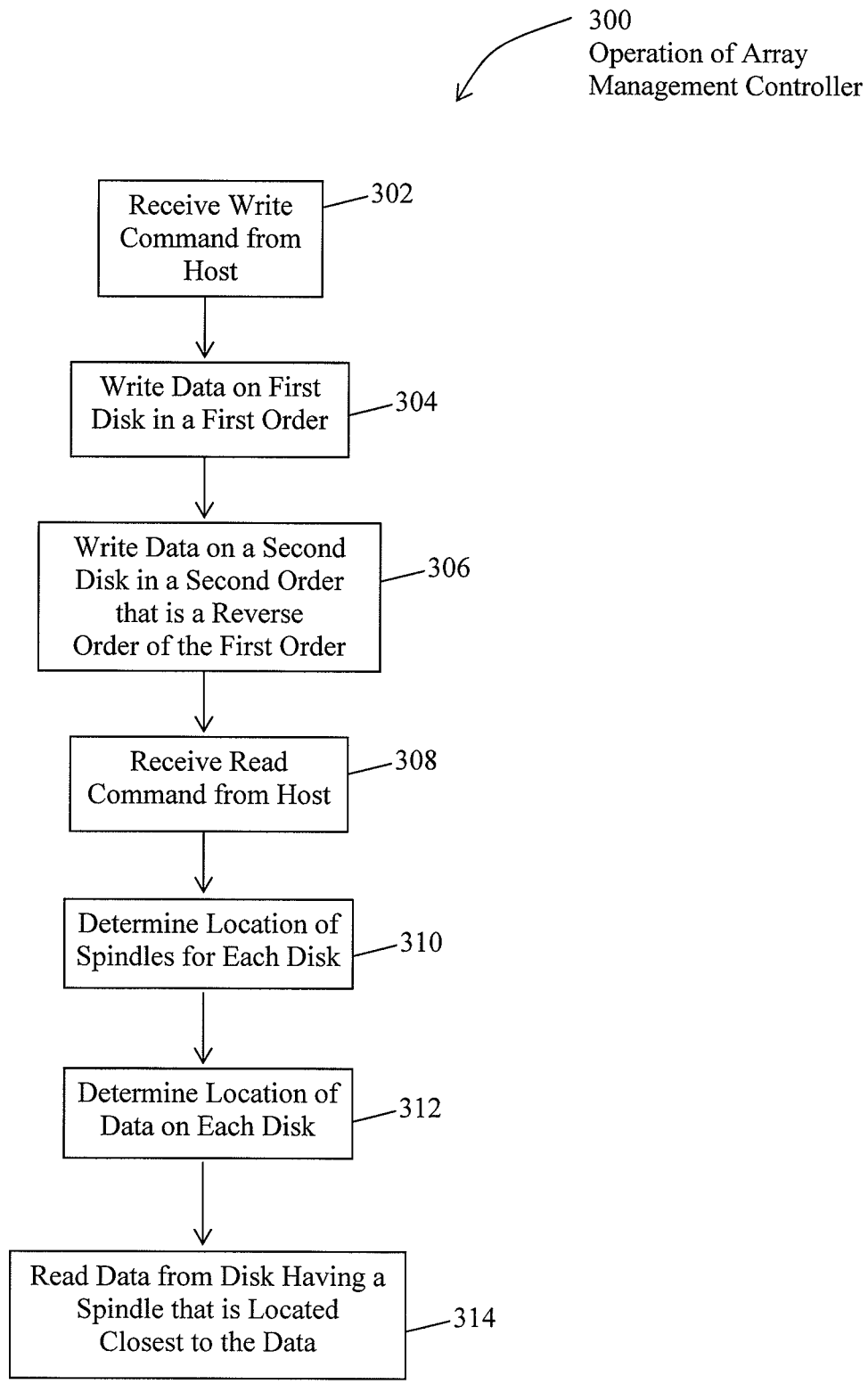
FIG. 3 is an embodiment of a flow chart for operating the array management controller.

FIG. 3 is a flow diagram 300 illustrating the operation of the array management controller 204 of FIG. 2. At step 302, the array management controller 204 receives a write command from host 202. At step 304, the array management controller 204 writes data on the first disk 206 in a progressive order, starting with block 00 in sector 214, block 01 in sector 216, block 02 in sector 218 and block 03 in sector 220. At step 306, the array management controller 204 writes data on the second disk 208 in a reverse order. As shown in FIG. 2, data block 00 is written in the last sector 228. Block 01 is written in the second to last sector 226, block 02 is written in the third to last sector 224, and block 03 is written in the first sector 222. At step 308, a read command is received by the array management controller 204 from the host 202. At step 310, the array management controller 204 determines the location of spindle 210 on disk 206 and the location of spindle 212 on disk 208. The array management controller 204 then determines the distance of each of the spindles 210, 212 from the block of data that is to be read by the host 202 at step 312. At step 314, the array management controller 204 generates a control signal to the spindle that is located closest to the data to read the data. For example, if host 202 requested data block 03, the array management controller 204 would utilize spindle 212 to read block 03 from sector 222 of disk 208, since the spindle 212 is located on sector 222. Similarly, if the host 202 had requested data from data block 00, the array management controller 204 would request spindle 210 to read data from sector 214 of disk 206, since the spindle 210 is located on sector 214. In this manner, latency and delay relating to movement of spindles 210, 212 can be avoided using the system illustrated in FIG. 2. Of course, the spindles 210, 212 can be located at the bottom sectors 220, 228 when a read request is made by the host 202. In that case, the array management controller 204 would select the spindle 210, 212 to read data from the disks 206, 208 in which the spindles 210, 212 are located in the closest proximity to the requested data that is stored on the disks.

In this fashion, the performance of the modified RAID Level I system 200 is nearly as fast as the performance of a RAID level 0 system during the reading of data. In addition, the modified RAID Level I system 200 provides a high degree of redundancy, which guards against the loss of data. Access time by spindles 210, 212 is greatly reduced in the system 200 illustrated in FIG. 2. For these reasons, the reverse mirroring system illustrated in FIG. 2 reduces overall system time for reading data in a mirrored direct attached storage system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of storing data in a RAID Level I system comprising:
   generating a write command to store said data;
   storing said data in a first order on a first disk in said system;
   storing data in a second order on a second disk in said system, said second order being a reverse order from said first order;
   generating a read command to read said data;
   determining a distance of a first spindle on said first disk from said data stored on said first disk to generate a first distance;
   determining a distance of a second spindle on said second disk from said data stored on said second disk to generate a second distance; and
   reading data from said first disk when said first distance is smaller than said second distance and reading data from said second disk when said second distance is smaller than said first distance,
   wherein said process of storing data in a first order comprises storing data in blocks on sequential sectors of said first disk and said second disk, and
   wherein said process of storing data in blocks on sequential sectors on said first disk comprises:
   storing data in blocks on sequential sectors on said first disk that are arranged from a first sector of said first disk to a last sector of said first disk; and, wherein said process of storing data in blocks on sequential sectors on said second disk comprises; and
   storing data in blocks on sequential sectors on said second disk that are arranged from a last sector of said second disk to a first sector of said second disk.

2. The method of claim 1 further comprising:
   using an array management controller to generate said write command and said read command.

3. A reverse mirroring storage device comprising:
   a first disk having a first plurality of sectors for storing blocks of data;
   a first spindle for writing said blocks of data to said first disk and reading said blocks of data from said first disk;
   a second disk having a second plurality of sectors for storing said blocks of data;
   a second disk spindle for writing said blocks of data to said second disk and reading said blocks of data from said second disk; and
   an array management controller that controls said first spindle to store said blocks of data, in response to write commands, on said first disk in a first order and controls said second spindle to store said blocks of data on said second disk in a second order, said second order being a reverse order of said first order and, in response to a read command to read a selected block of data, determines a first physical distance of said first spindle from said selected block of data stored on said first disk, and determines a second physical distance of said second spindle from said selected block of data stored on said second disk, and selects a spindle to read data from said first disk or said second disk based upon the shortest distance of said first physical distance and said second physical distance,
   wherein said array management controller stores said blocks of data on said first disk in said first order from a first sector to a last sector of said first disk and stores said blocks of data on said second disk in said second order from a last sector to a first sector of said second disk.

4. A storage system, comprising:

first and second disks that each contain a spindle for reading and writing data;

and a Redundant Array of Independent Disks (RAID) storage controller communicatively coupled to the disks to control read and write operations to the disks, and to mirror data on the disks, wherein the RAID storage controller reverse mirrors the data on the disks by sequentially writing blocks of data from a first sector to a last sector on the first disk and sequentially writing the blocks of data from the last sector to the first sector on the second disk in response to a read request for a block of data by a host, the RAID storage controller determines a location of the spindles of the first and second disks, and selects one of the first and second disks to read the block of data based on the location of the spindles of the first and second disks, and the location of the request block of data.

5. The storage system of claim 4, further comprising: a third disk operable to mirror the data of the first disk.

6. A method operable with a Redundant Array of Independent Disks (RAID) storage controller, the method comprising:

controlling a spindle for each of a first and second disk to read and write data;

reverse mirroring data on the first and second disks by:

sequentially writing blocks of data from a first sector to a last sector on the first disk; and sequentially writing the blocks of data from the last sector to the first sector on the second disk;

in response to a read request for a block of data by a host, the RAID storage controller determines a location of the spindles of the first and second disks, and selects one of the first and second disks to read the block of data based on the location of the spindles of the first and second disks, and the location of the requested block of data.

7. The method of claim 6, further comprising: mirroring the data of the first disk on a third disk.

8. A non transitory computer readable medium comprising instructions that, when executed by a Redundant Array of Independent Disks (RAID) storage controller, direct the RAID storage controller to:

control a spindle for each of a first and second disk to read and write data;

reverse mirror data on the first and second disks by:

sequentially writing blocks of data from a first sector to a last sector on the first disk; and sequentially writing the blocks of data from the last sector to the first sector on the second disk;

in response to a read request for a block of data by a host, the RAID storage controller determines a location of the spindles of the first and second disks, and selects one of the first and second disks to read the block of data based on the location of the spindles of the first and second disks, and the location of the requested block of data.

9. The computer readable medium of claim 8, further comprising: mirroring the data of the first disk on a third disk.

\* \* \* \* \*